United States Patent
Moon

(10) Patent No.: US 11,321,014 B2
(45) Date of Patent: May 3, 2022

(54) MEMORY SYSTEM, MEMORY CONTROLLER, AND OPERATING METHOD FOR PERFORMING STATUS CHECK BASED ON STATUS CHECK DELAY INFORMATION

(71) Applicant: SK hynix Inc., Icheon (KR)

(72) Inventor: Min Hwan Moon, Seoul (KR)

(73) Assignee: SK hynix Inc., Icheon (KR)

( * ) Notice: Subject to any disclaimer, the term of this patent is extended or adjusted under 35 U.S.C. 154(b) by 7 days.

(21) Appl. No.: 16/837,452

(22) Filed: Apr. 1, 2020

(65) Prior Publication Data

US 2021/0103406 A1     Apr. 8, 2021

(30) Foreign Application Priority Data

Oct. 8, 2019   (KR) .................... 10-2019-0124512

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/0688; G06F 3/0653
See application file for complete search history.

(56) References Cited

U.S. PATENT DOCUMENTS

| | | | |
|---|---|---|---|
| 10,140,027 B1 * | 11/2018 | Canepa | G06F 3/0659 |
| 2016/0110114 A1 * | 4/2016 | Moon | G06F 12/0246 |
| | | | 711/103 |
| 2017/0371575 A1 * | 12/2017 | Park | G06F 3/064 |
| 2019/0065421 A1 * | 2/2019 | Baysah | G06F 13/38 |

FOREIGN PATENT DOCUMENTS

| | | |
|---|---|---|
| KR | 20180065423 A | 6/2018 |
| KR | 1020200117555 A | 10/2020 |

OTHER PUBLICATIONS

Wikipedia, "Moving average," Oct. 7, 2019 https://web.archive.org/web/20191007035748/https://en.wikipedia.org/wiki/Moving_average.*

* cited by examiner

*Primary Examiner* — Tracy A Warren

(57) ABSTRACT

A memory system, a memory controller and an operating method are disclosed. By determining, based on status check delay information, a time point at which a status check command is sent to a memory device and updating the status check delay information while the memory device is in an idle state, it is possible to minimize a degradation in the performance of a program operation for the memory device including a plurality of memory dies, and it is possible to reflect a variation in an operation characteristic of the memory device, on the program operation.

20 Claims, 14 Drawing Sheets determine when to send a status check command to the memory device based on SCD_INF_DIE_2

MEMORY SYSTEM, MEMORY CONTROLLER, AND OPERATING METHOD FOR PERFORMING STATUS CHECK BASED ON STATUS CHECK DELAY INFORMATION

CROSS-REFERENCE TO RELATED APPLICATION

The present application claims priority under 35 U.S.C. 119(a) to Korean Patent Application No. 10-2019-0124512 filed in the Korean Intellectual Property Office on Oct. 8, 2019, which is incorporated herein by reference in its entirety.

BACKGROUND

1. Technical Field

Various embodiments generally relate to a memory system, a memory controller, and an operating method thereof.

2. Related Art

A memory system corresponding to a storage device stores data based on a request of a host, such as a computer, a mobile terminal such as a smartphone or a tablet, or any of various electronic devices. The memory system may include not only a device which stores data in a magnetic disk, such as a hard disk drive (HDD), but also a device which stores data in a nonvolatile memory, such as a solid state drive (SDD), a universal flash storage (UFS) device, an embedded MMC (eMMC) device, or the like.

The memory system may include a memory controller for controlling a memory device (e.g., a volatile memory and/or a nonvolatile memory) included in the memory system. The memory controller may receive a request from the host, and may perform or control operations of reading, writing, and erasing data with respect to the memory device in response to the received request. The memory controller may drive a firmware for performing logical calculations to execute or control these operations.

The memory system divisionally stores data in a plurality of modules (e.g., memory dies) included in the memory device. In this regard, the plurality of modules may have different data writing times from one another due to different operation characteristics thereof. Attributable to this fact, performance degradation may occur during a process in which the memory system stores data in the memory device.

SUMMARY

Various embodiments are directed to a memory system, a memory controller, and an operating method, capable of minimizing degradation in the performance of a program operation of a memory device when a plurality of memory dies included in the memory device have different program times from one another.

Also, various embodiments are directed to a memory system, a memory controller, and an operating method, capable of reflecting a variation in an operation characteristic of a memory device on a program operation when the operation characteristic of the memory device varies with the lapse of time.

In one aspect, embodiments of the disclosure may provide a memory system including: a memory device including a plurality of memory dies each of which includes a plurality of memory blocks; and a memory controller configured to control the memory device.

The memory controller may load status check delay information for each of the plurality of memory dies, from the memory device.

The memory controller may determine, based on the status check delay information, a point of time at which the status check command is sent to the memory device. The status check command may be a command which instructs the memory device to perform an operation of checking whether a program operation is completed.

The memory controller may update the status check delay information while the memory device is in an idle state.

The memory controller may update the status check delay information by measuring a program time of a target memory block selected from among the memory blocks in the memory device.

The memory controller may measure the program time of the target memory block by sending, to the memory device, a dummy command. The dummy command may be a command which instructs the memory device to perform an operation of programming dummy data to the target memory block.

The memory controller may measure the program time of the target memory block every measurement period.

The memory controller may update the status check delay information based on a weighted moving average value for a program time of the target memory block that is measured at each measurement period.

The memory controller may determine the point of time at which the status check command is sent to the memory device based on a minimum value of the status check delay information for the plurality of memory dies.

In another aspect, embodiments of the disclosure may provide a memory controller including: a memory interface configured to communicate with a memory device including a plurality of memory dies each of which includes a plurality of memory blocks; and a control circuit configured to control the memory device.

The control circuit may load status check delay information for each of the plurality of memory dies, from the memory device.

The control circuit may determine, based on the status check delay information, a point of time at which the status check command is sent to the memory device. The status check command may be a command which instructs the memory device to perform an operation of checking whether a program operation is completed.

The control circuit may update the status check delay information while the memory device is in an idle state.

The control circuit may update the status check delay information by measuring a program time of a target memory block selected from among the memory blocks in the memory device.

The control circuit may measure the program time of the target memory block by sending, to the memory device, a dummy command. The dummy command may be a command which instructs the memory device to perform an operation of programming dummy data to the target memory block.

The control circuit may measure the program time of the target memory block every measurement period.

The control circuit may update the status check delay information, based on a weighted moving average value for a program time of the target memory block that is measured at each measurement period.

The control circuit may determine the point of time at which the status check command is sent to the memory device based on a minimum value of the status check delay information for the plurality of memory dies.

In still another aspect, embodiments of the disclosure may provide a method of operating a memory controller suitable for controlling a memory device.

The method for operating a memory controller may include loading status check delay information for each of the plurality of memory dies included in the memory device, from the memory device that includes the plurality of memory dies.

The method for operating a memory controller may include determining, based on the status check delay information, a point of time at which the status check command is sent to the memory device. The status check command may be a command which instructs the memory device to perform an operation of checking whether a program operation is completed.

The method for operating a memory controller may include updating the status check delay information while the memory device is in an idle state.

According to the embodiments of the present disclosure, it is possible to minimize degradation in the performance of a program operation when program times of a plurality of memory dies included in a memory device are different from one another.

Also, according to the embodiments of the present disclosure, it is possible to reflect a variation in an operation characteristic of a memory device on a program operation when the operation characteristic of the memory device varies with the lapse of time.

DETAILED DESCRIPTION

Hereinafter, various examples of embodiments of the present disclosure will be described in detail with reference to the accompanying drawings.

Figure 1:
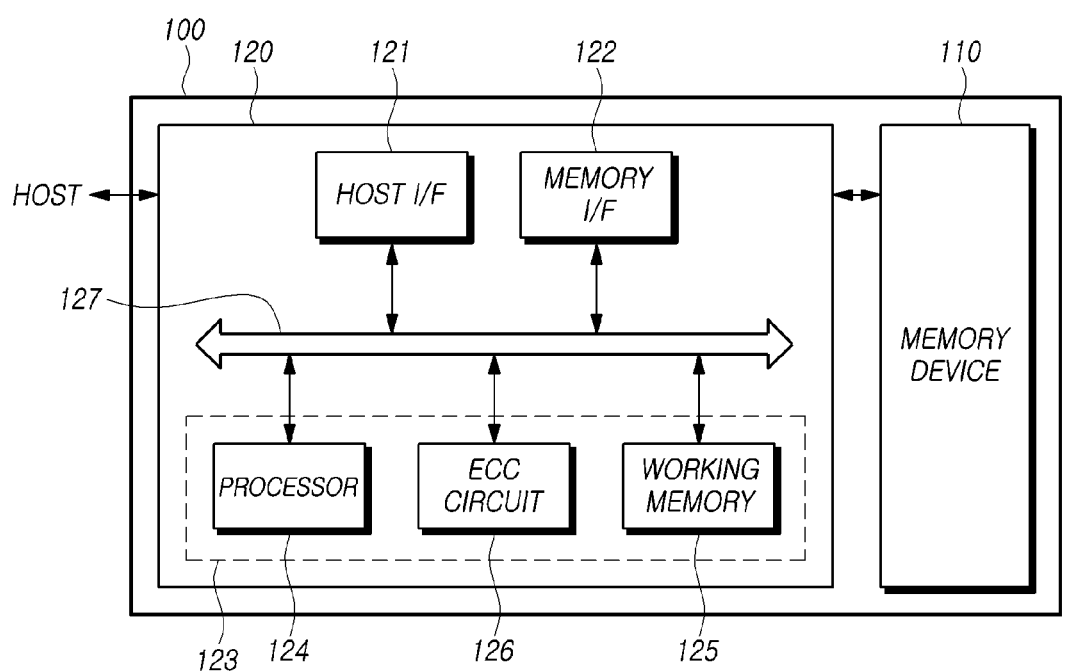
FIG. 1 illustrates a memory system in accordance with an embodiment of the present disclosure.

FIG. 1 illustrates a memory system 100 in accordance with an embodiment of the present disclosure.

Referring to FIG. 1, the memory system 100 may include a memory device 110 which stores data, and a memory controller 120 which controls operations of the memory device 110.

The memory device 110 includes a plurality of memory blocks, and performs operations in response to the control of the memory controller 120. The operations of the memory device 110 may include a read operation, a program operation (also referred to as a write operation), an erase operation, and so on.

The memory device 110 may include a memory cell array including a plurality of memory cells (also simply referred to as "cells") which store data. Such a memory cell array may exist in each of the plurality of memory blocks.

The memory device 110 may include any of a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), and so on.

The memory device 110 may have a three-dimensional array structure. Embodiments of the present disclosure may be applied to not only a flash memory device in which a charge storage layer is configured of a conductive floating gate but also a charge trap flash (CTF) memory device in which a charge storage layer is configured of a dielectric layer.

The memory device 110 receives a command, an address, and so forth from the memory controller 120, and accesses a memory region in the memory cell array that is selected by the address. In other words, the memory device 110 may perform an operation corresponding to the command on the memory region selected by the address.

For example, the memory device 110 may perform a program operation, a read operation, and an erase operation. In the program operation, the memory device 110 may program data in the memory region selected by the address. In the read operation, the memory device 110 may read data from the memory region selected by the address. In the erase operation, the memory device 110 may erase data stored in the memory region selected by the address.

The memory controller 120 may control write (program), read, erase, and background operations for the memory device 110. For example, the background operation may include one or more of a garbage collection (GC) operation, a wear leveling (WL) operation, a bad block management (BBM) operation, and so forth.

The memory controller 120 may control an operation of the memory device 110 in response to a request of a host. Unlike this, the memory controller 120 may control an operation of the memory device 110 regardless of a request of the host.

In an embodiment, the memory controller 120 and the host may be separated from each other. In another embodiment, the memory controller 120 and the host may be integrated into one device. Hereinafter, for the sake of convenience in explanation, it will be assumed that the memory controller 120 and the host are separated from each other.

Referring to FIG. 1, the memory controller 120 may include a memory interface 122 and a control circuit 123, and may further include a host interface 121.

The host interface 121 provides an interface for communication with the host.

When receiving a request from the host, the control circuit 123 may receive the request through the host interface 121, and then, may perform an operation of processing the received request.

The memory interface 122 is coupled with the memory device 110 and provides an interface for communication with the memory device 110. That is to say, the memory interface 122 may provide the interface between the memory device 110 and the memory controller 120 under the control of the control circuit 123.

The control circuit 123 performs general control operations of the memory controller 120, thereby controlling operations of the memory device 110. To this end, for instance, the control circuit 123 may include a processor 124 and a working memory 125, and may further include an error detection and correction (ECC) circuit 126.

The processor 124 may control the general control operations of the memory controller 120, and may perform a logical calculation. The processor 124 may communicate with the host through the host interface 121, and may communicate with the memory device 110 through the memory interface 122.

The processor 124 may perform a function of a flash translation layer FTL. The processor 124 may translate a logical block address LBA, provided by the host, into a physical block address PBA through the flash translation layer FTL. The flash translation layer FTL may receive the logical block address LBA and translate the received logical block address LBA into the physical block address PBA using a mapping table.

There are various address mapping methods of the flash translation layer FTL depending on a mapping unit. Representative address mapping methods include a page mapping method, a block mapping method, and a hybrid mapping method. However, embodiments are not limited thereto.

The processor 124 is configured to randomize data received from the host. For example, the processor 124 may randomize the data received from the host using a randomizing seed, in a program operation. Randomized data is provided to the memory device 110 and programmed to a memory cell array of the memory device 110.

The processor 124 is configured to derandomize data received from the memory device 110, in a read operation. For example, the processor 124 may derandomize the data received from the memory device 110 using a derandomizing seed. Derandomized data may be outputted to the host.

The processor 124 may control operations of the memory controller 120 by executing a firmware. In other words, in order to control the general control operations of the memory controller 120 and perform the logical calculation, the processor 124 may execute or drive a firmware loaded to the working memory 125 upon booting.

The firmware as a program to be executed in the memory system 100 may include various functional layers.

For example, the firmware may include at least one among the flash translation layer FTL, a host interface layer HIL, a flash interface layer FIL, and so forth. The flash translation layer FTL performs a translating function between a logical address requested to the memory system 100 from the host and a physical address of the memory device 110. The host interface layer HIL serves to analyze a request from the host and transfer the request to the flash translation layer FTL. The flash interface layer FIL transfers a command, instructed from the flash translation layer FTL, to the memory device 110.

For instance, such a firmware may be stored in the memory device 110 and then be loaded to the working memory 125.

The working memory 125 may store a firmware, a program code, a command, and data that are necessary to drive the memory controller 120. The working memory 125, as a volatile memory, may include at least one among an SRAM (static RAM), a DRAM (dynamic RAM), an SDRAM (synchronous DRAM), and the like.

The error detection and correction (ECC) circuit 126 may be configured to detect an error bit of target data and correct the detected error bit using an error correction code. Here, the target data may be data stored in the working memory 125, data read from the memory device 110, or the like.

The ECC circuit 126 may decode data using an error correction code. The ECC circuit 126 may include any of various code decoders. For example, a decoder for performing unsystematic code decoding or a decoder for performing systematic code decoding may be used to implement the ECC circuit 126.

For example, the ECC circuit 126 may detect an error bit for each read data in a unit of sector. Namely, each read data may be constituted by a plurality of sectors. A sector may be a data unit smaller than a page that is a read unit of a flash memory. The sectors constituting each read data may be matched with one another by an address.

The ECC circuit 126 may calculate a bit error rate BER, and may determine whether an error is correctable or not in the unit of sector. For example, when the bit error rate BER is higher than a reference value, the ECC circuit 126 may determine that a corresponding sector is uncorrectable or a failed sector. On the other hand, when the bit error rate BER is equal to or lower than the reference value, the ECC circuit 126 may determine that the corresponding sector is correctable or a passed sector.

The ECC circuit 126 may perform an error detection and correction operation sequentially for all read data. When a sector included in read data is correctable, the ECC circuit 126 may omit an error detection and correction operation for a corresponding sector for next read data. When the error detection and correction operation for all read data is completed in this way, the ECC circuit 126 may detect a sector that is finally determined to be uncorrectable. There may be one or more sectors that are determined to be uncorrectable. The ECC circuit 126 may transfer information (for example, address information) on the one or more sectors determined to be uncorrectable, to the processor 124.

A bus 127 may be configured to provide channels among the components 121, 122, 124, 125, and 126 of the memory controller 120. The bus 127 may include, for example, a control bus for transferring various control signals, commands, and the like, a data bus for transferring various data, and so forth.

The above-described components 121, 122, 124, 125, and 126 of the memory controller 120 are for an illustration purpose only. Some of the above-described components 121, 122, 124, 125, and 126 of the memory controller 120 may be omitted, or some of the above-described components 121, 122, 124, 125, and 126 of the memory controller 120 may be integrated into one. As the case may be, in addition to the above-described components 121, 122, 124, 125, and 126, the memory controller 120 may include one or more other components.

Hereinbelow, the memory device 110 will be described in further detail with reference to FIG. 2.

Figure 2:
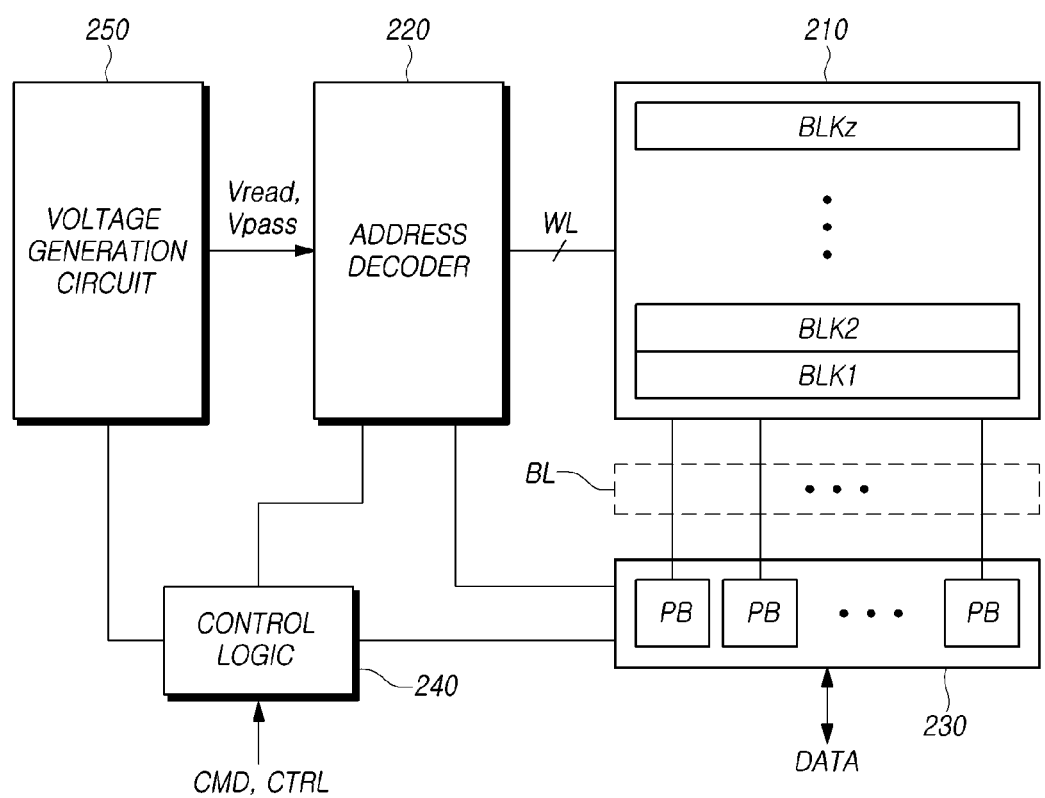
FIG. 2 illustrates a memory device in accordance with an embodiment of the present disclosure.

FIG. 2 illustrates the memory device 110 of FIG. 1 in accordance with an embodiment of the present disclosure.

Referring to FIG. 2, the memory device 110 may include a memory cell array 210, an address decoder 220, a read and write circuit 230, a control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells MCs may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a multiplicity of memory cells MCs. For example, the multiplicity of memory cells MCs may be nonvolatile memory cells, and the nonvolatile memory cells may have a vertical channel structure.

The memory cell array 210 may have a two-dimensional structure or a three-dimensional structure.

Each of the plurality of memory cells MCs included in the memory cell array 210 may store at least 1-bit data. For instance, each of the plurality of memory cells MCs included in the memory cell array 210 may be a signal level cell (SLC) which stores 1-bit data. For another instance, each of the plurality of memory cells MCs included in the memory cell array 210 may be a multi-level cell (MLC) which stores 2-bit data. For another instance, each of the plurality of memory cells MCs included in the memory cell array 210 may be a triple level cell (TLC) which stores 3-bit data. For still another instance, each of the plurality of memory cells MCs included in the memory cell array 210 may be a quad level cell (QLC) which stores 4-bit data. For yet another instance, the memory cell array 210 may include a plurality of memory cells MCs, each of which stores 5 or more-bit data.

Referring to FIG. 2, the address decoder 220, the read and write circuit 230, the control logic 240, and the voltage generation circuit 250 may operate as peripheral circuits for driving the memory cell array 210.

The address decoder 220 may be coupled to the memory cell array 210 through the plurality of word lines WL.

The address decoder 220 may operate in response to the control of the control logic 240.

The address decoder 220 may receive an address through an input/output buffer (not shown) in the memory device 110. The address decoder 220 may decode a block address in the received address. The address decoder 220 may select at least one memory block corresponding to the decoded block address.

The address decoder 220 may receive a read voltage Vread and a pass voltage Vpass from the voltage generation circuit 250.

In a read voltage applying operation, the address decoder 220 may apply the read voltage Vread to a selected word line WL in a selected memory block and the pass voltage Vpass to the remaining unselected word lines WL in the selected memory block.

In a program verify operation, the address decoder 220 may apply a verify voltage generated by the voltage generation circuit 250 to the selected word line WL in the selected memory block and the pass voltage Vpass to the remaining unselected word lines WL in the selected memory block.

The address decoder 220 may be configured to decode a column address in the received address. The address decoder 220 may transmit the decoded column address to the read and write circuit 230.

A read operation and a program operation of the memory device 110 may be performed in a unit of page. An address received when the read operation or the program operation is requested may include at least one of a block address, a row address, and a column address.

The address decoder 220 may select one memory block and one word line based on the block address and the row address, respectively. The column address may be decoded by the address decoder 220 and provided to the read and write circuit 230.

The address decoder 220 may include at least one of a block decoder, a row decoder, a column decoder, and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit, which includes the plurality of page buffers PB. The read and write circuit 230 may include data buffers which take charge of a data processing function, and may further include cache buffers which take charge of a caching function.

The plurality of page buffers PB may be coupled to the memory cell array 210 through the plurality of bit lines BL. The plurality of page buffers PB may continuously supply sensing currents to bit lines BL coupled with memory cells to sense threshold voltages Vth of the memory cells in a read operation and a program verify operation, and may latch sensing data by sensing a change of an amount of current flowing through a sensing node according to a programmed state of a selected memory cell.

The read and write circuit 230 may operate in response to page buffer control signals outputted from the control logic 240.

In a read operation, the read and write circuit 230 temporarily stores read data, and outputs the stored read data to the input/output buffer of the memory device 110. In an embodiment, the read and write circuit 230 may include a column select circuit in addition to the plurality of page buffers PB (or page registers).

The control logic 240 may be coupled with the address decoder 220, the read and write circuit 230, and the voltage generation circuit 250. The control logic 240 may receive a command CMD and a control signal CTRL through the input/output buffer of the memory device 110.

The control logic 240 may control general operations of the memory device 110 in response to the control signal CTRL. The control logic 240 may output control signals for adjusting precharge potential levels of sensing nodes of the plurality of page buffers PB.

The control logic 240 may control the read and write circuit 230 to perform the read operation of the memory cell array 210. The voltage generation circuit 250 may generate the read voltage Vread and the pass voltage Vpass used in the read operation, in response to a control signal provided by the control logic 240.

Figure 3:
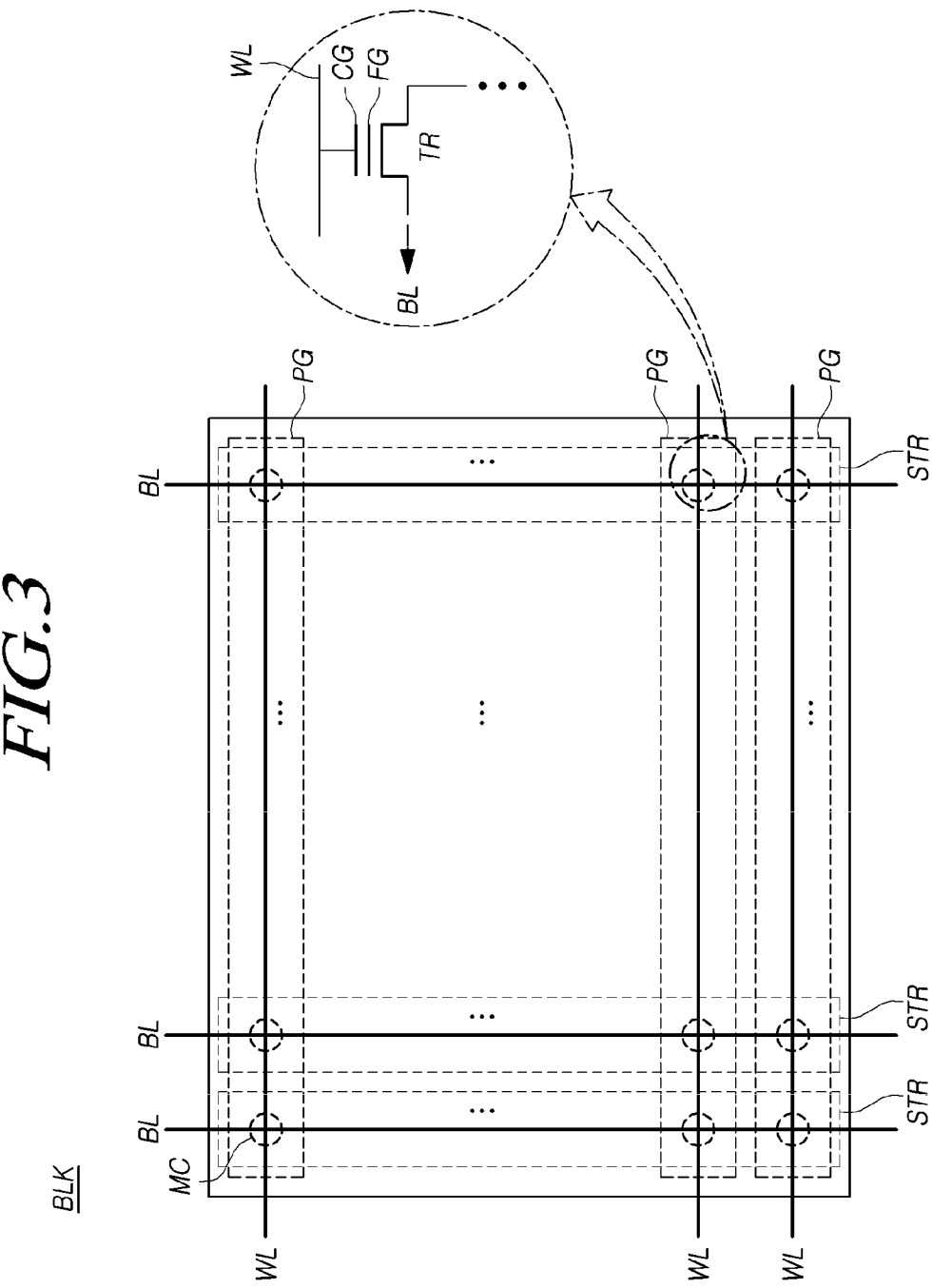
FIG. 3 illustrates a memory block in accordance with an embodiment of the present disclosure.

FIG. 3 illustrates a memory block BLK of the memory device 110 shown in FIG. 2 in accordance with an embodiment of the present disclosure.

Referring to FIG. 3, the memory block BLK may include a plurality of pages PG and a plurality of strings STR.

The plurality of pages PG correspond to a plurality of word lines WL, and the plurality of strings STR correspond to a plurality of bit lines BL.

In the memory block BLK, the plurality of word lines WL and the plurality of bit lines BL may be disposed to intersect with each other. For example, each of the plurality of word lines WL may extend in a row direction, and each of the plurality of bit lines BL may extend in a column direction. For another example, each of the plurality of word lines WL may extend in the column direction, and each of the plurality of bit lines BL may extend in the row direction.

As the plurality of word lines WL and the plurality of bit lines BL intersect with each other, a plurality of memory cells MCs may be disposed at intersections of the plurality of word lines WL and the plurality of bit lines BL.

Each of the memory cells MCs may include a transistor TR. The transistor TR may include a drain, a source, and a gate. The drain (or source) of the transistor TR may be coupled with a corresponding bit line BL directly or via another transistor. The source (or drain) of the transistor TR may be coupled with a source line directly or via another transistor. The source line may be grounded. The gate of the transistor TR may include a floating gate FG and a control gate CG. The floating gate FG may be enclosed by a dielectric layer, and a gate voltage provided through a word line WL may be applied to the control gate CG.

In each of the plurality of memory blocks BLK1 to BLKz shown in FIG. 2, a first select line (also referred to as a source select line (or a drain select line)) may be additionally disposed outside a first outermost word line, which is closer to the read and write circuit 230, between two outermost word lines, and a second select line (also referred to as a drain select line (or a source select line)) may be additionally disposed outside a second outermost word line between the two outermost word lines.

In addition, at least one first dummy word line may be disposed between the first outermost word line and the first select line. At least one second dummy word line may be additionally disposed between the second outermost word line and the second select line.

When the memory device 110 has a memory block structure illustrated in FIG. 3, a read operation and a program operation (write operation) may be performed in a unit of page, and an erase operation may be performed in a unit of memory block.

Figure 4:
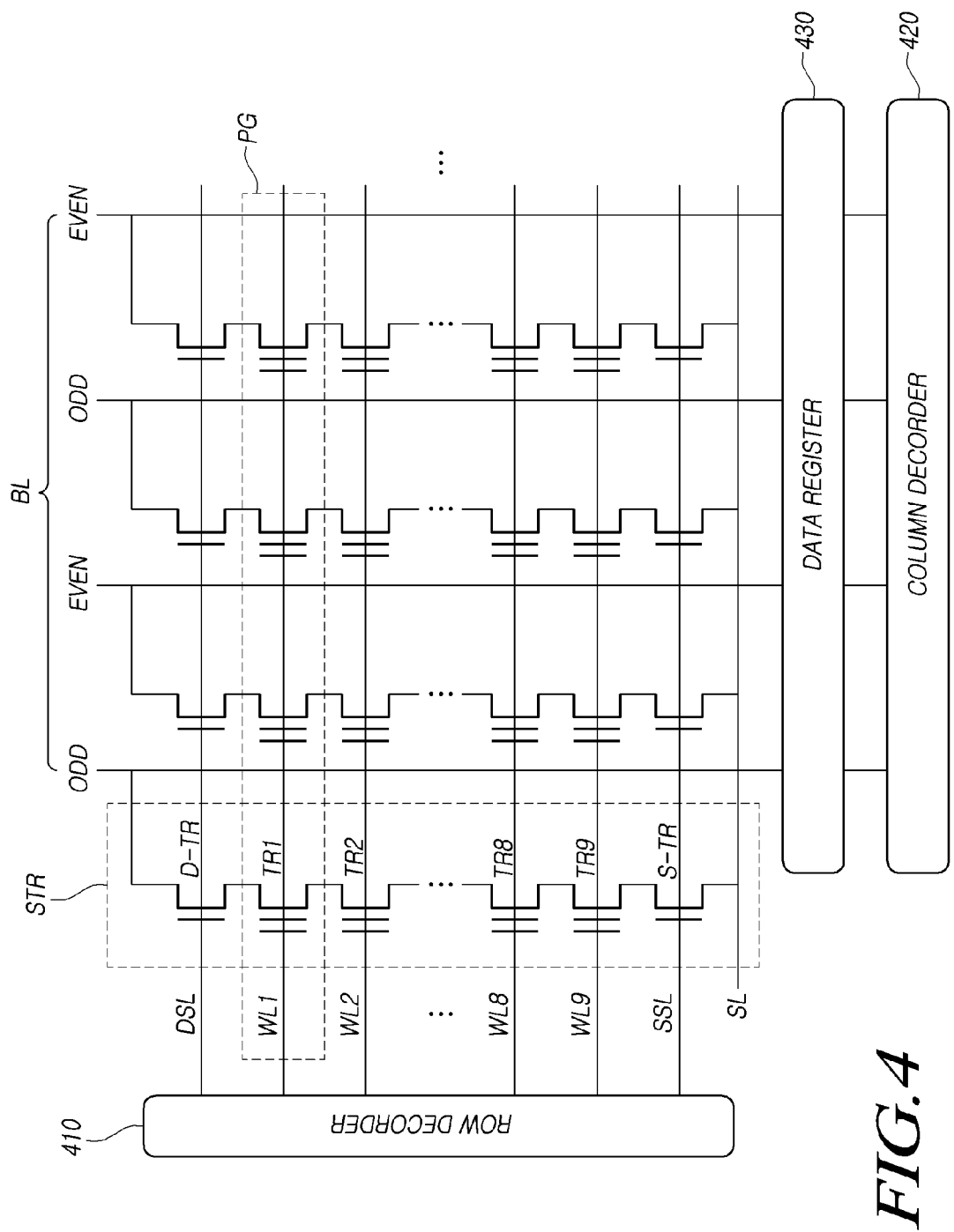
FIG. 4 illustrates a structure of word lines and bit lines of a memory device in accordance with an embodiment of the present disclosure.

FIG. 4 illustrates a structure of word lines WL and bit lines BL of the memory device 110 shown in FIG. 2 in accordance with an embodiment of the present disclosure.

Referring to FIG. 4, the memory device 110 may include a core area and an auxiliary area. Memory cells MC are disposed in the core area, and the auxiliary area corresponds to the remaining area except the core area in the memory device 110. In the core area, a plurality of pages PG and a plurality of strings STR are disposed.

Referring to FIG. 4, a plurality of word lines WL1 to WL9 and a plurality of bit lines BL are disposed to intersect with each other. The plurality of word lines WL1 to WL9 may be coupled with a row decoder 410, and the plurality of bit lines BL may be coupled with a column decoder 420. A data register 430 corresponding to the read and write circuit 230 of FIG. 2 may be disposed between the plurality of bit lines BL and the column decoder 420.

For example, as illustrated in FIG. 4, the plurality of word lines WL1 to WL9 may correspond to the plurality of pages PG, respectively. Unlike this, if the size of each of the plurality of word lines WL1 to WL9 is large, each of the plurality of word lines WL1 to WL9 may correspond to at least two or more (for example, two or four) pages PG. A page PG is a minimum unit in performing a program operation and a read operation. The program operation and the read operation may be performed on all memory cells MCs in the same page PG simultaneously.

The plurality of bit lines BL may include odd-numbered bit lines BL and even-numbered bit lines BL.

In order to access target memory cells MCs, an address may be entered into the core area through the row decoder 410 and the column decoder 420 via input/output terminals, and may designate the target memory cells MCs. Designating the target memory cells MCs means accessing the target memory cells MCs positioned at sites where the word lines WL1 to WL9 coupled with the row decoder 410 and the bit lines BL coupled with the column decoder 420 intersect with each other in order to program data to the target memory cells MCs or read out programmed data from the target memory cells MCs.

A page PG extending in a first direction (e.g., an X-axis direction) is bound (coupled) by a common line which is referred to as a word line WL, and a string STR extending in a second direction (e.g., a Y-axis direction) is bound (coupled) by a common line which is referred to as a bit line BL. Being bound in common means that corresponding memory cells MCs are structurally coupled with one another by the same material layer, and the same voltage is simultaneously applied to the memory cells MCs through the same material layer. Although the same voltage is applied thereto, a memory cell MC disposed at an intermediate position or a memory cell MC disposed at the last position, among the memory cells MCs connected in series to the same material layer, may be influenced by a voltage drop in its preceding memory cell MC. Therefore, voltages applied to a first memory cell MC and the last memory cell MC among the memory cells MCs connected in series to the same material layer may be slightly different from each other.

Since data is programmed and read via the data register 430 in all data processing operations of the memory device 110, the data register 430 plays a key role in the memory device 110. Therefore, when data processing is delayed in the data register 430, all the other components in the memory device 110 need to hold their operations until the data register 430 completes the data processing. As a result, when the performance of the data register 430 is degraded, the overall performance of the memory device 110 may be degraded.

Referring to FIG. 4, one string STR includes a plurality of transistors TR1 to TR9 that are coupled with the plurality of word lines WL1 to WL9, respectively. Areas where the plurality of transistors TR1 to TR9 exist correspond to memory cells MC in the corresponding string STR. Each of the plurality of transistors TR1 to TR9 includes a control gate CG and a floating gate FG, as described above with reference to FIG. 3.

The plurality of word lines WL1 to WL9 include a first outermost word line WL1 and a second outermost word line WL9 that are disposed closer to both ends of the string STR, respectively. A first select line DSL may be disposed outside the first outermost word line WL1, and a second select line SSL may be disposed outside the second outermost word line WL9. In a signal path of the string STR, the data register 430 is closer to the first outermost word line WL1 than the second outermost word line WL9.

A first select transistor D-TR includes a gate electrode coupled with the first select line DSL, but does not include a floating gate FG. A second select transistor S-TR includes a gate electrode coupled with the second select line SSL, but does not include a floating gate FG.

The first select transistor D-TR serves as a switch that turns on or off the coupling between a corresponding string STR and the data register 430. The second select transistor S-TR serves as a switch that turns on or off the coupling between the corresponding string STR and a source line SL. That is to say, the first select transistor D-TR and the second select transistor S-TR are positioned at both ends of the corresponding string STR, and serve as gatekeepers that couple and decouple signals.

In a program operation, in order to fill electrons in a target memory cell MC of a bit line BL that is to be programmed, the memory system 100 turns on the first select transistor D-TR by applying a set turn-on voltage Vcc to the gate electrode of the first select transistor D-TR, and turns off the second select transistor S-TR by applying a set turn-off voltage (e.g., 0V) to the gate electrode of the second select transistor S-TR.

In a read operation or a verify operation, the memory system 100 turns on both the first select transistor D-TR and the second select transistor S-TR. Accordingly, a current may be discharged to the source line SL corresponding to the ground through the corresponding string STR, and thus a voltage level of the bit line BL may be measured. However, in the read operation, there may be a time difference between on-off timings of the first select transistor D-TR and the second select transistor S-TR since the first select transistor D-TR and the second select transistor S-TR are positioned at both ends of the corresponding string STR.

In an erase operation, the memory system 100 may supply a set voltage (e.g., +20V) to a substrate through the source line SL. In the erase operation, the memory system 100 floats both the first select transistor D-TR and the second select transistor S-TR, thereby providing infinite resistance. Accordingly, the memory system 100 is structured such that the first select transistor D-TR and the second select transistor S-TR do not function and electrons may operate due to a potential difference only between a floating gate FG and the substrate.

Figure 5:
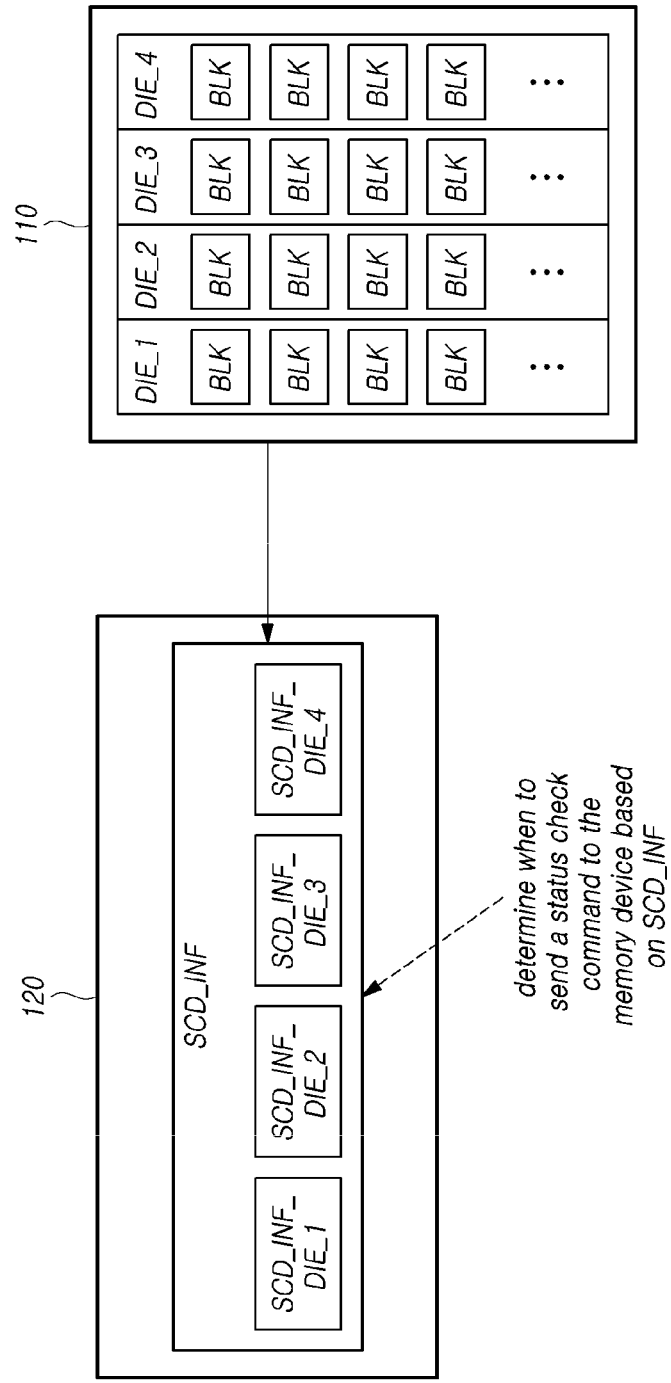
FIG. 5 illustrates an operation of loading status check delay information in a memory system in accordance with an embodiment of the present disclosure.

FIG. 5 illustrates an operation of loading status check delay information in the memory system 100 shown in FIG. 1 in accordance with an embodiment of the present disclosure.

Referring to FIG. 5, the memory device 110 included in the memory system 100 may include a plurality of memory dies DIE_1, DIE_2, DIE_3, and DIE_4, each of which includes a plurality of memory blocks BLK. FIG. 5 illustrates the memory device 110 that includes the four memory dies DIE_1, DIE_2, DIE_3, and DIE_4. However, the number of memory dies included in the memory device 110 is not limited thereto.

The memory controller 120 included in the memory system 100 may load status check delay information SCD_INF for each of the plurality of memory dies DIE_1, DIE_2, DIE_3, and DIE_4, from the memory device 110.

The status check delay information SCD_INF indicates a status check delay corresponding to a time difference between when the memory controller 120 instructs the memory device 110 to perform a program operation on a memory block included in a corresponding memory die and when the memory controller 120 sends, to the memory device 110, a status check command for checking whether the program operation for the corresponding memory block is completed.

The status check command is used to instruct the memory device 110 to perform an operation of checking whether the program operation is completed when the memory device 110 performs the program operation.

When it is determined that the program operation is not completed as a result of checking a status of the memory device 110, the memory controller 120 may send again the status check command to the memory device 110 to check whether the program operation is completed.

For example, if status check delay information for a specific memory die is 10 ms, the memory controller 120 may send a status check command to the memory device 110 when 10 ms is over after instructing the memory device 110 to perform a program operation on a memory block included in the specific memory die.

The reason why the memory controller 120 gives the memory device 110 a time delay that is set from when the memory controller 120 instructs the memory device 110 to perform a program operation to when the memory controller 120 sends a status check command to the memory device 110 is because, while the memory device 110 occupies a channel in a process of processing the status check command for the specific memory die, a read/program operation for another memory die which shares the channel cannot be performed. In particular, while the memory controller 120 may read/program data from/to a super memory block configured with memory blocks included in different memory dies, in an interleaving manner, if a read/program operation for another memory die cannot be performed due to the processing of the status check command for the specific memory die, the read/program performance of the memory system 100 may be degraded.

Therefore, the memory controller 120 may set the time delay until the status check command is sent to the memory device 110, so that the read/program operation for the other memory die may be performed while performing the program operation for the specific memory die.

The memory controller 120 may load the status check delay information SCD_INF from the memory device 110 upon booting. The status check delay information SCD_INF may be stored in some of the memory blocks included in the memory device 110.

The status check delay information SCD_INF loaded from the memory device 110 may be stored in the working memory 125 included in the memory controller 120.

The memory controller 120 may determine a point of time at which the status check command is sent to the memory device 110 based on the status check delay information SCD_INF.

Referring to FIG. 5, when the memory device 110 includes the four memory dies DIE_1 to DIE_4, the status check delay information SCD_INF may include i) first die status check delay information SCD_INF_DIE_1 indicating a status check delay for the memory die DIE_1, ii) second die status check delay information SCD_INF_DIE_2 indicating a status check delay for the memory die DIE_2, iii) third die status check delay information SCD_INF_DIE_3 indicating a status check delay for the memory die DIE_3, and iv) fourth die status check delay information SCD_INF_DIE_4 indicating a status check delay for the memory die DIE_4.

For example, it is assumed that the first die status check delay information SCD_INF_DIE_1 is 10 ms and the second die status check delay information SCD_INF_DIE_2 is 15 ms. In this case, when performing a first program operation on a memory block included in the memory die DIE_1, the memory controller 120 may send a status check command to the memory device 110 when 10 ms is over after the first program operation is started. Further, when performing a second program operation on a memory block included in the memory die DIE_2, the memory controller 120 may send a status check command to the memory device 110 when 15 ms is over after the second program operation is started.

When the memory controller 120 performs the first and second program operations in parallel for the memory block included in the memory die DIE_1 and the memory block included in the memory die DIE_2, the memory controller 120 may send a status check command to the memory device 110 when 10 ms (a smaller value of 10 ms and 15 ms) is over or when 15 ms (a larger value of 10 ms and 15 ms) is over after the first and second program operations are started.

The reason why the memory controller 120 determines a point of time at which a status check command is sent to the memory device 110 based on the above-described status check delay information SCD_INF is as follows.

A time required to program a given amount of data into a memory die may be defined as a program time for the memory die. Since the memory die is in a busy state while the data is programmed to the memory die, the program time may also be referred to as a busy time of the memory die, and its meaning is not limited by a designation thereof. Since a program time for each memory die may vary depending on a characteristic of each memory die, e.g., degradation over time, temperature, a characteristic of each word line, etc., it may be difficult to predict the program time.

If the memory controller 120 sends a status check command to the memory device 110 before a program time for a specific memory die passes after a program operation is started on the specific memory die, the status check command may occupy a channel, and this may disturb a read/program operation for another memory die, as described above.

On the other hand, if the memory controller 120 sends the status check command to the memory device 110 after the program time for the specific memory die passes, a status check operation for the specific memory die may be performed as being delayed even though the program operation for the specific memory die is completed. As a result, a next operation (e.g., a read/program operation) for the specific memory die may be delayed.

Therefore, in order to minimize performance degradation caused by sending a status check command to the memory device 110 too early or too late, i.e., by sending the status check command to the memory device 110 at an improper point of time, the memory controller 120 may optimize a point of time at which the status check command is sent to the memory device 110 based on the above-described status check delay information SCD_INF.

Meanwhile, the status check delay information SCD_INF loaded to the memory controller 120 may be updated with the lapse of time, instead of being maintained as a fixed value. This is because an operating characteristic of a memory die included in the memory device 110 may be degraded as read/program/erase operations are repeatedly performed with the lapse of time or may vary by an external condition (e.g., temperature). Thus, in order to reflect such a variation in an operating characteristic of a memory die on a program operation, the memory controller 120 may update the status check delay information SCD_INF.

Hereinafter, a point of time at which the memory controller 120 updates the status check delay information SCD_INF will be described.

Figure 6:
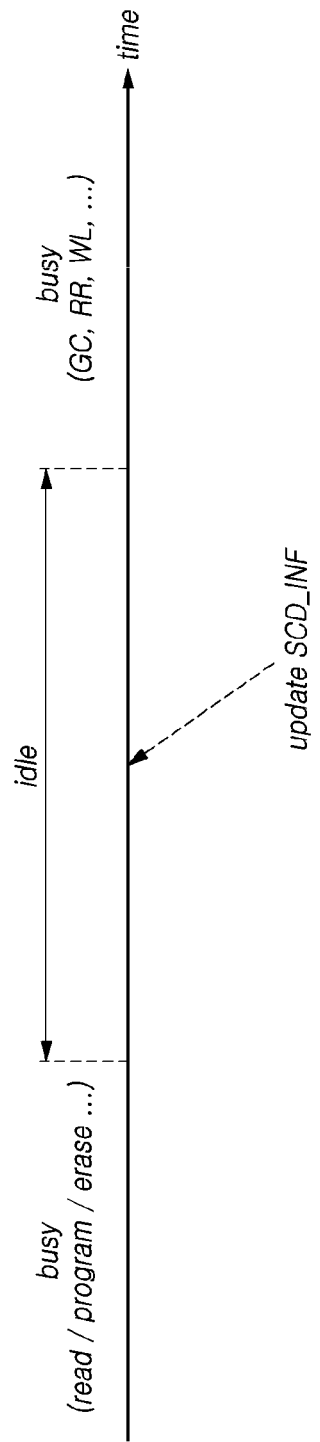
FIG. 6 illustrates a point of time at which status check delay information is updated in a memory system in accordance with an embodiment of the present disclosure.

FIG. 6 illustrates a point of time at which status check delay information SCD_INF is updated in the memory system 100 shown in FIG. 1 in accordance with an embodiment of the present disclosure.

Referring to FIG. 6, the memory controller 120 included in the memory system 100 may update the status check delay information SCD_INF while the memory device 110 is in an idle state.

When the memory device 110 is in the idle state, the memory device 110 does not execute any of an operation (e.g., a read/program/erase operation) requested by the host and a background operation (e.g., GC, RR, or WL) triggered by the memory controller 120.

As the memory controller 120 updates the status check delay information SCD_INF while the memory device 110 is in the idle state, it is possible to prevent the performance degradation from occurring when the memory device 110 executes a read/program/erase operation or a background operation. The performance degradation may occur when the status check delay information SCD_INF is updated while the memory device 110 executes a read/program/erase operation or a background operation.

Hereinafter, a method for the memory controller 120 to update the status check delay information SCD_INF will be described.

Figure 7:
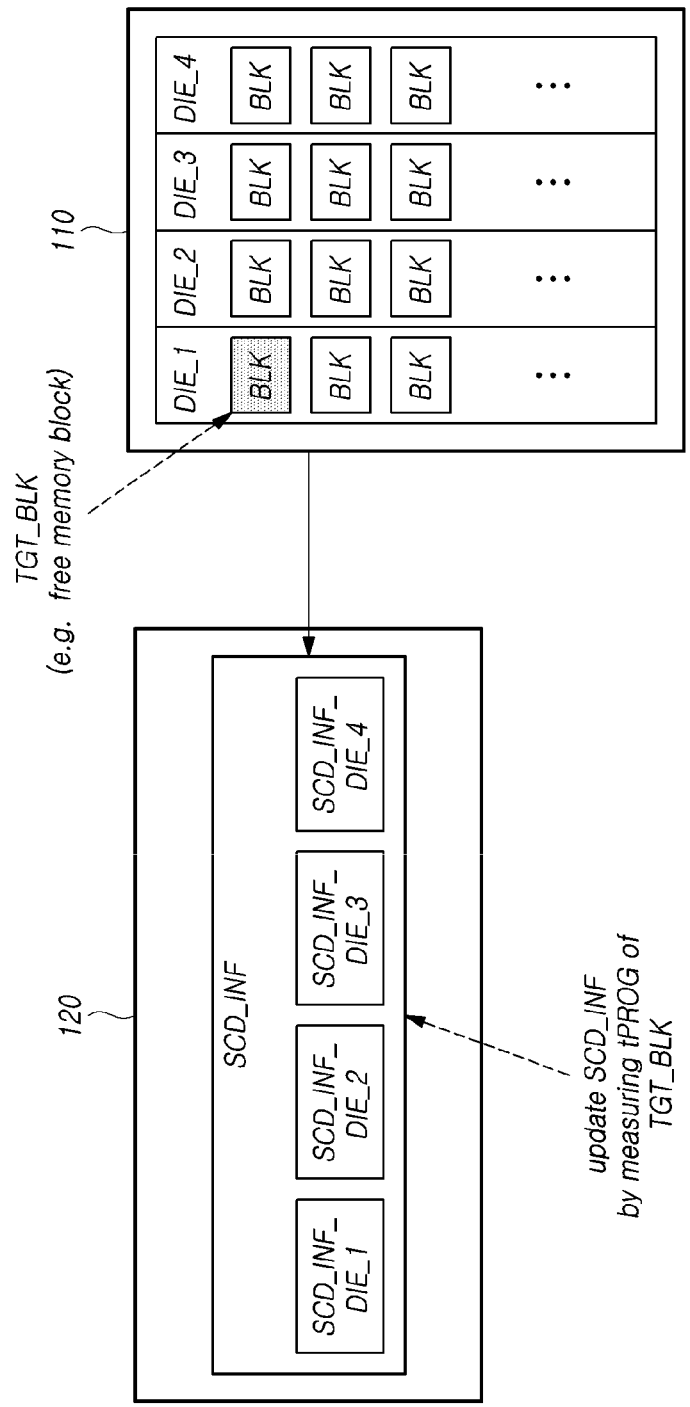
FIG. 7 illustrates a target memory block used to update status check delay information in a memory system in accordance with an embodiment of the present disclosure.

FIG. 7 illustrates a target memory block used to update the status check delay information SCD_INF in the memory system 100 shown in FIG. 1 in accordance with an embodiment of the present disclosure.

Referring to FIG. 7, the memory controller 120 may measure a program time tPROG for a target memory block TGT_BLK among the memory blocks BLK included in the memory device 110, and may update the status check delay information SCD_INF stored in the memory controller 120 using the measured program time tPROG.

The memory controller 120 may select the target memory block TGT_BLK among the memory blocks BLK included in the memory device 110 using various methods.

For example, the memory controller 120 may randomly select one of the memory blocks BLK included in the memory device 110, as the target memory block TGT_BLK.

For example, the memory controller 120 may select one free memory block among the memory blocks BLK included in the memory device 110, as the target memory block TGT_BLK. A free memory block is a memory block to which valid data is not programmed yet after an erase operation is completed on the memory block.

The reason why the memory controller 120 selects the target memory block TGT_BLK among free memory blocks is because the memory controller 120 can program arbitrary data, e.g., dummy data, to measure the program time tPROG of the target memory block TGT_BLK and then erases the arbitrary data from the target memory block TGT_BLK. The arbitrary data programmed to the target memory block TGT_BLK for the purpose of measuring the program time tPROG should be deleted not to be accessed by the host since the arbitrary data is not data programmed by a request of the host.

If the arbitrary data is programmed to the target memory block TGT_BLK in which valid data is stored and then data stored in the target memory block TGT_BLK is erased, there is a possibility that the valid data stored in the target memory block TGT_BLK is lost. Therefore, the memory controller 120 may select one of the free memory blocks in which no valid data is stored, as the target memory block TGT_BLK.

A part of the status check delay information SCD_INF that is to be updated may vary depending on a memory die in which the target memory block TGT_BLK is included.

For example, as shown in FIG. 7, when the target memory block TGT_BLK is included in the memory die DIE_1, the memory controller 120 may measure the program time tPROG of the target memory block TGT_BLK, and may update the first die status check delay information SCD_INF_DIE_1, which indicates a status check delay for the memory die DIE_1, in the status check delay information SCD_INF.

Unlike this, if the target memory block TGT_BLK is included in the memory die DIE_2, the memory controller 120 may measure the program time tPROG of the target memory block TGT_BLK, and may update the second die status check delay information SCD_INF_DIE_2, which indicates a status check delay for the memory die DIE_2, in the status check delay information SCD_INF.

Figure 8:
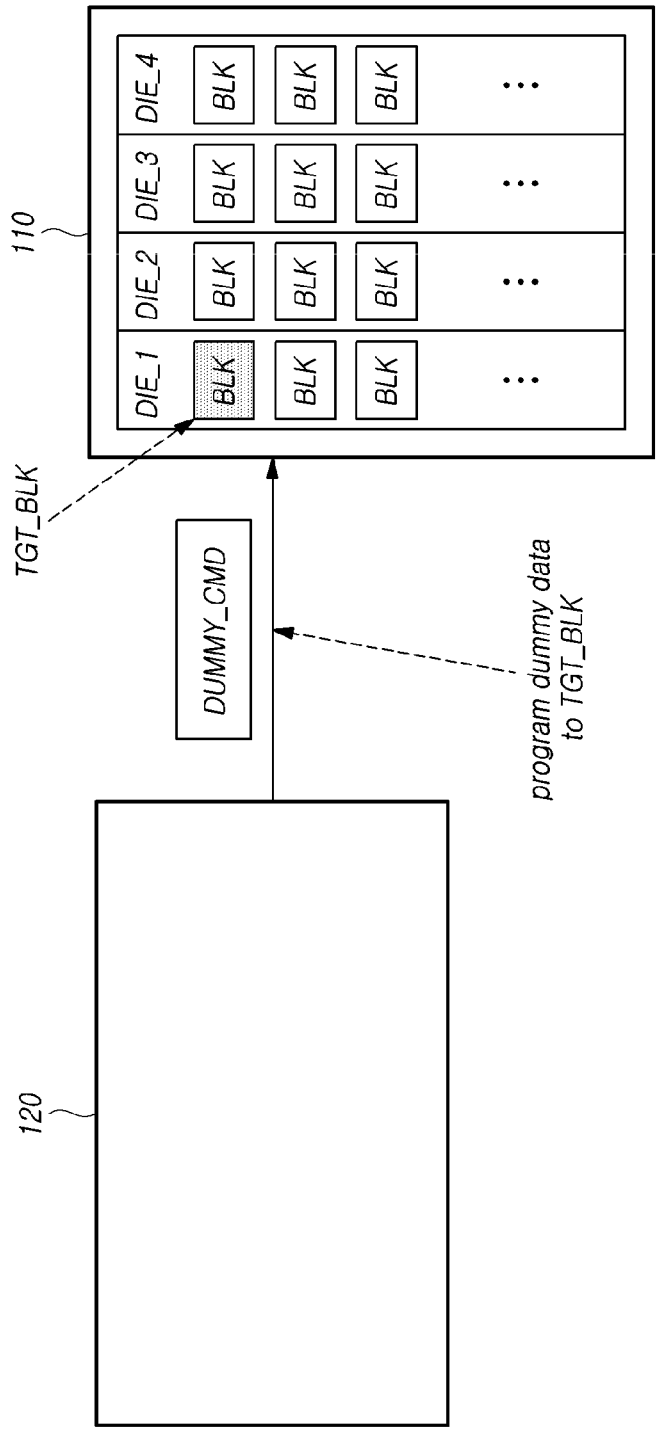
FIG. 8 illustrates an operation of measuring a program time of a target memory block in a memory system in accordance with an embodiment of the present disclosure.

FIG. 8 illustrates an operation of measuring a program time of a target memory block TGT_BLK in the memory system 100 shown in FIG. 1 in accordance with an embodiment of the present disclosure.

Referring to FIG. 8, the memory controller 120 sends a dummy command DUMMY_CMD to the memory device 110 to measure the program time tPROG of the target memory block TGT_BLK.

The dummy command DUMMY_CMD is a command which instructs the memory device 110 to perform an operation of programming dummy data to the target memory block TGT_BLK of the memory device 110. The dummy data is used only for the purpose of measuring the program time tPROG of the target memory block TGT_BLK, and thus is not accessed by the host. The dummy command DUMMY_CMD may also be referred to as a training command or a measurement command, and its meaning is not limited by a designation thereof.

A size of the dummy data may be set to be equal to or less than a size of data which can be stored in memory cells coupled to one word line. The size of the dummy data is set to be small, so that the memory device 110 quickly processes an operation requested by the host, e.g., a read/program/erase operation, when the memory device 110 receives a request from the host while processing the dummy command DUMMY_CMD.

For example, the program time tPROG of the target memory block TGT_BLK may be measured by programming dummy data in only one word line. In another example, the program time tPROG of the target memory block TGT_BLK may be measured by programming dummy data to each of a plurality of word lines. In the latter case, the program time tPROG of the target memory block TGT_BLK may be determined as an average, a maximum value, or a minimum value of measurement values corresponding to the plurality of word lines.

For example, when it is assumed that a program time of dummy data corresponding to a word line 0 is 5 ms, a program time of dummy data corresponding to a word line 1 is 4 ms, and a program time of dummy data corresponding to a word line 2 is 6 ms, the program time tPROG of the target memory block TGT_BLK may be determined as 4 ms that is a minimum value among 4 ms, 5 ms, and 6 ms.

Figure 9:
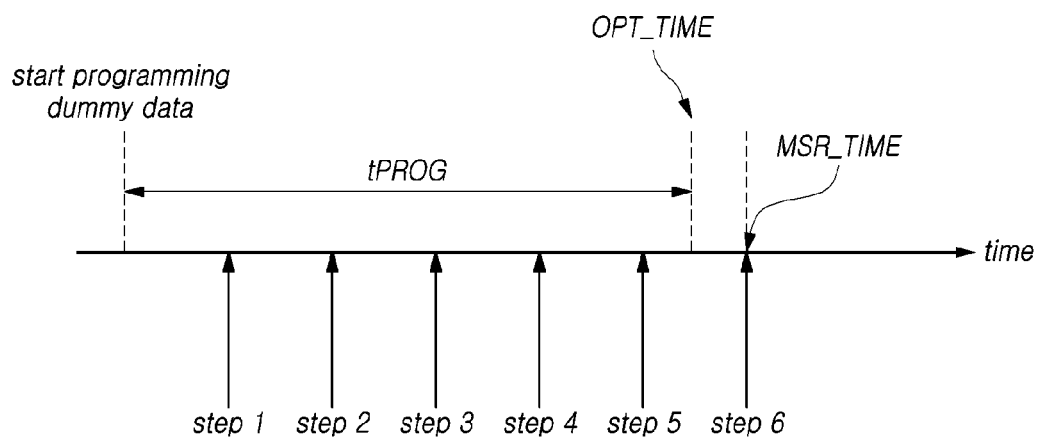
FIG. 9 illustrates a method of measuring a program time of a target memory block in a memory system in accordance with an embodiment of the present disclosure.

FIG. 9 illustrates a method of measuring a program time of a target memory block TGT_BLK in the memory system 100 shown in FIG. 1 in accordance with an embodiment of the present disclosure.

Referring to FIG. 9, after a program operation for dummy data is started in response to a dummy command DUMMY_CMD, the memory controller 120 checks at every preset time (e.g., 1 ms) whether the program operation instructed by the dummy command DUMMY_CMD is completed, in order to measure the program time of the target memory block TGT_BLK. In FIG. 9, step 1 to step 6 respectively represent the numbers of preset times checked after the program operation for the dummy data is started.

Referring to FIG. 9, the memory controller 120 may check at step 5 that the program operation for the dummy data is not completed yet, and may check at step 6 that the program operation for the dummy data is completed. Therefore, the memory controller 120 may determine that the program operation instructed by the dummy command DUMMY_CMD is completed after six preset times are over.

In this case, a slight gap may exist between a point of time OPT_TIME at which the program operation for the dummy data is actually completed and a point of time MSR_TIME at which the program time of the target memory block TGT_BLK is determined by the memory controller 120.

A point of time at which the program time of the target memory block TGT_BLK is measured may be set in a variety of ways. As described above, in an embodiment, the memory controller 120 may measure the program time of the target memory block TGT_BLK when a preset specific event, e.g., the completion of the program operation for the dummy data, occurs.

In another embodiment, the memory controller 120 may regularly measure the program time of the target memory block TGT_BLK. Hereinafter, descriptions will be made for the case where the memory controller 120 regularly measures the program time of the target memory block TGT_BLK.

Figure 10:
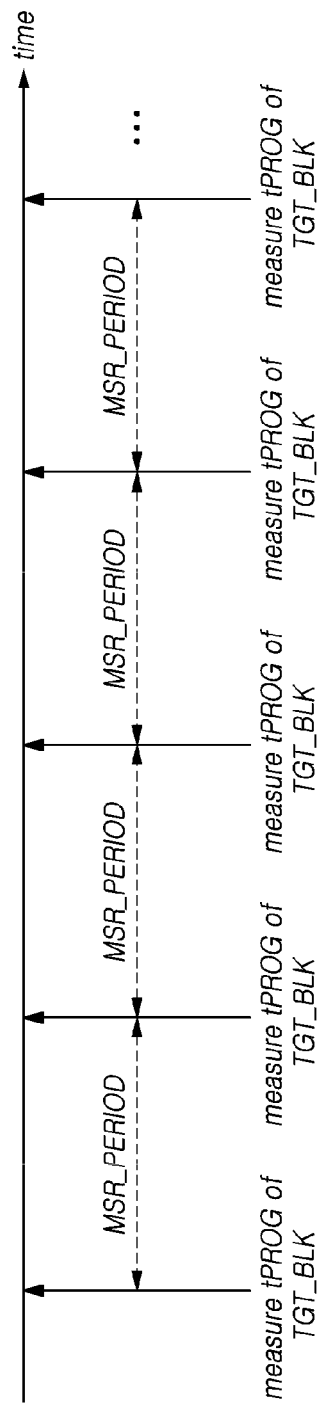
FIG. 10 illustrates a measurement period for measuring a program time of a target memory block in a memory system in accordance with an embodiment of the present disclosure.

FIG. 10 illustrates a measurement period for measuring a program time tPROG of the target memory block TGT_BLK in the memory system 100 shown in FIG. 1 in accordance with an embodiment of the present disclosure.

Referring to FIG. 10, the memory controller 120 may measure the program time tPROG of the target memory block TGT_BLK every set measurement period MSR_PERIOD.

The measurement period MSR_PERIOD may be a fixed value, but may be changed over time.

This is because, while an operating characteristic of each of the memory dies included in the memory device 110 varies with the lapse of time, if the memory controller 120 measures the program time tPROG of the target memory block TGT_BLK at a fixed measurement period without considering such a variation in the operating characteristic, the degradation of the target memory block TGT_BLK may be accelerated, which may affect the overall reliability of the memory system 100.

Also, this is because, if the memory controller 120 measures the program time tPROG of the target memory block TGT_BLK at a fixed measurement period even in the case where the memory device 110 needs to quickly process an operation requested by the host, a processing speed of the operation requested by the host may slow down, which may reduce the overall throughput of the memory system 100.

Hereunder, an example in which the above-described measurement period is changed will be described.

Figure 11:
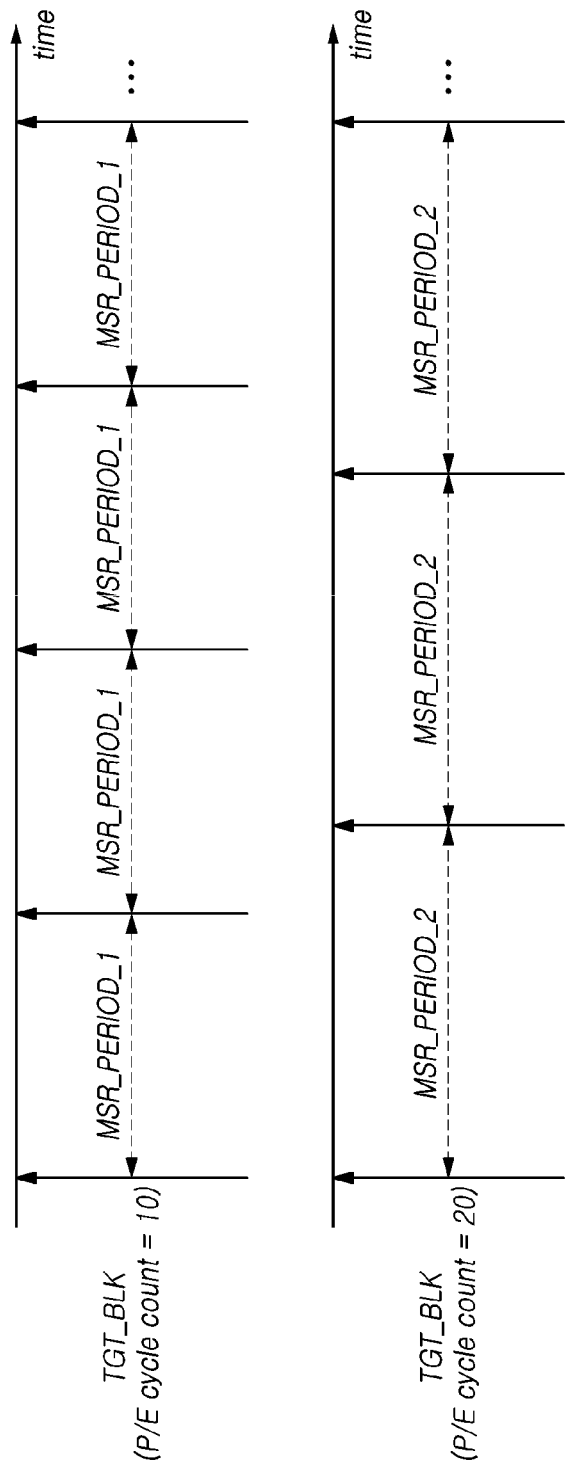
FIG. 11 illustrates a change in a measurement period depending on a program/erase cycle counting value in a memory system in accordance with an embodiment of the present disclosure.

FIG. 11 illustrates a change in a measurement period depending on a program/erase (P/E) cycle count in the memory system 100 shown in FIG. 1 in accordance with an embodiment of the present disclosure.

A program/erase cycle count for a memory block indicates how many times a program/erase operation of programming data to the memory block and then erasing the data to reprogram another data has been performed on the memory block.

Referring to FIG. 11, a measurement period MSR_PERIOD_1 when the program/erase cycle count of the target memory block TGT_BLK is 10 is shorter than a measurement period MSR_PERIOD_2 when the program/erase cycle count of the target memory block TGT_BLK is 20. In other words, as the program/erase cycle count of the target memory block TGT_BLK increases, the measurement period MSR_PERIOD for measuring a program time of the target memory block TGT_BLK becomes longer.

The reason why the measurement period MSR_PERIOD for measuring the program time of the target memory block TGT_BLK becomes longer as the program/erase cycle count of the target memory block TGT_BLK increases is as follows.

As described above, the memory controller 120 programs the dummy data to the target memory block TGT_BLK to measure the program time of the target memory block TGT_BLK and then erases the dummy data from the target memory block TGT_BLK.

When the program/erase cycle count of the target memory block TGT_BLK has a high value, it means that the target memory block TGT_BLK has been programmed/erased a lot and thus the performance degradation occurs. Therefore, as the operation of programming the dummy data to the target memory block TGT_BLK to measure the program time of the target memory block TGT_BLK and then erasing the target memory block TGT_BLK is repeated, the performance degradation of the target memory block TGT_BLK is accelerated. Thus, the measurement period MSR_PERIOD for measuring the program time of the target memory block TGT_BLK should be longer to slow down the performance degradation of the target memory block TGT_BLK.

The memory controller 120 may update status check delay information SCD_INF based on a weighted moving average value for a program time of the target memory block TGT_BLK that is measured at each measurement period.

A method of obtaining the weighted moving average value reflects latest data on an average with a priority over old data. For instance, the weighted moving average value may be obtained by the following equation.

$$f(n+1) = f(n) + ((cur\_val) - f(n)) * (weight),$$ [Equation]

wherein f(n) represents a previous average value calculated at an nth measurement time, f(n+1) represents a current average value calculated at an (n+1)th measurement time, cur_val represents latest data, and weight represents a weight applied to the latest data.

For example, when it is assumed that f(n)=1, cur_val=2, and weight=0.5, f(n+1)=1+(2-1)*(0.5)=1.5.

Hereinafter, an example of updating the status check delay information SCD_INF using the above-described method of obtaining the weighted moving average value will be described.

It is assumed that the weighted moving average value of a program time for the target memory block TGT_BLK, previously calculated by the memory controller 120, is 10 ms. In addition, it is assumed that the target memory block TGT_BLK is included in the memory die DIE_1 included in the memory device 110. Moreover, it is assumed that the weight applied when calculating a weighted moving average value is 0.5.

At this time, it is assumed that the latest data, i.e., a program time for the target memory block TGT_BLK currently measured by the memory controller 120, is 15 ms. In this case, a weighted moving average value of the program time for the target memory block TGT_BLK is changed from 10 ms to 10+(15-10)*(0.5)=12.5 ms.

Thereafter, it is assumed that the latest data, i.e., a program time for the target memory block TGT_BLK measured again by the memory controller 120 after the measurement period MSR_PERIOD has passed, is 14.5 ms. In this case, a weighted moving average value of the program time for the target memory block TGT_BLK is changed from 12.5 ms to 12.5+(14.5-12.5)*(0.5)=13.5 ms.

The memory controller 120 may update the status check delay information SCD_INF based on 13.5 ms that is a latest value of a weighted moving average value of a program time for the target memory block TGT_BLK. The memory controller 120 may update the status check delay information SCD_INF to a value obtained by adding a set margin value, wherein the set margin value may be 0 or more.

For example, assuming that the set margin value is 0.5 ms, the memory controller 120 may update the status check delay information SCD_INF_DIE_1 for the memory die DIE_1 to 13.5+0.5=14 ms.

Figure 12:
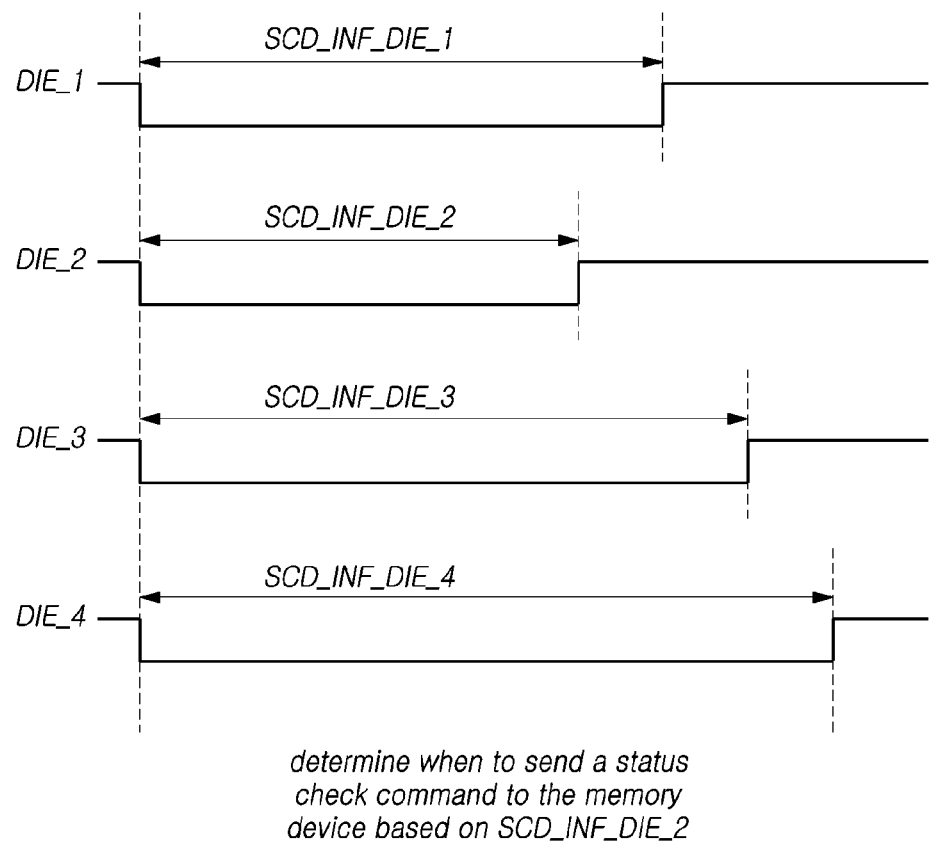
FIG. 12 illustrates an operation of determining a point of time for sending a status check command based on status check delay information in a memory system in accordance with an embodiment of the present disclosure.

FIG. 12 illustrates an operation of determining a point of time at which a status check command is sent to the memory device 110, based on the status check delay information SCD_INF, in the memory system 100 shown in FIG. 1 in accordance with an embodiment of the present disclosure.

The memory controller 120 may determine a point of time at which the status check command is sent to the memory device 110 based on a minimum value of the status check delay information SCD_INF for the plurality of memory dies in the memory device 110.

Referring to FIG. 12, the memory controller 120 may determine a point of time at which the status check command is sent to the memory device 110 based on the status check delay information SCD_INF_DIE_2 of the memory die DIE_2 that is a minimum value among the status check delay information SCD_INF_DIE_1, SCD_INF_DIE_2, SCD_INF_DIE_3, and SCD_INF_DIE_4 respectively for the four memory dies DIE_1, DIE_2, DIE_3, and DIE_4.

The reason why the memory controller 120 determines the point of time at which the status check command is sent to the memory device 110 based on a minimum value of the status check delay information SCD_INF is to perform a subsequent operation for a memory die for which a program operation has already been completed without any delay by processing a status check command for the memory die as soon as possible after the program operation has been completed.

For example, it is assumed that the status check delay information SCD_INF_DIE_1, SCD_INF_DIE_2, SCD_INF_DIE_3, and SCD_INF_DIE_4 of the four memory dies DIE_1, DIE_2, DIE_3, and DIE_4 is 15 ms, 10 ms, 20 ms, and 30 ms, respectively.

When it is assumed that the memory controller 120 determines a point of time at which the status check command is sent to the memory device 110 by using 15 ms instead of the minimum value of 10 ms among the status check delay information SCD_INF_DIE_1, SCD_INF_DIE_2, SCD_INF_DIE_3, and SCD_INF_DIE_4, the memory controller 120 sends the status check command when 15 ms is over after starting an operation of programming data in parallel to the four memory dies DIE_1, DIE_2, DIE_3, and DIE_4.

In this case, the memory die DIE_2 completes the program operation when 10 ms is over after starting the program operation, and then the memory die DIE_2 is in an idle state for 15−10=5 ms until the status check command is sent thereto. Therefore, a problem occurs in that a subsequent operation (e.g., read/program/erase) for the memory die DIE_2 is delayed by 5 ms.

Therefore, in order to solve the above problem, the memory controller 120 sends the status check command when 10 ms is over after the operation of programming data in parallel to the four memory dies DIE_1, DIE_2, DIE_3 and DIE_4 is started, so that a subsequent operation for the memory die DIE_2 can be performed without delay.

Figure 13:
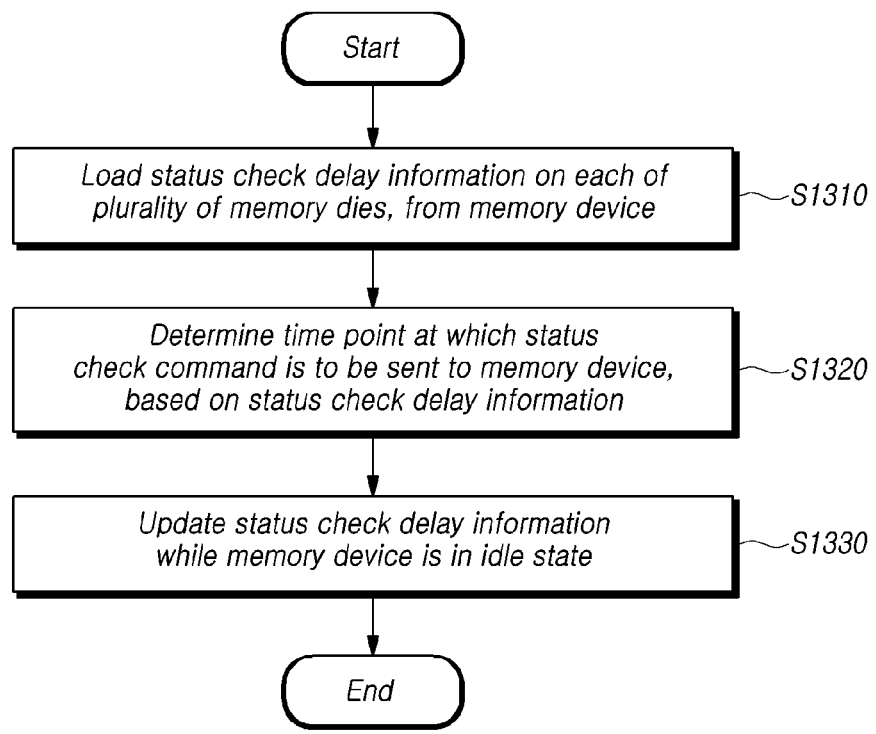
FIG. 13 is a flow chart illustrating a method of operating a memory controller in accordance with an embodiment of the present disclosure.

FIG. 13 is a flow chart illustrating a method of operating the memory controller 120 shown in FIG. 1 in accordance with an embodiment of the present disclosure.

Referring to FIG. 13, the memory controller 120 may load status check delay information SCD_INF for each of a plurality of memory dies included in the memory device 110 from the memory device 110 at S1310.

The memory controller 120 may determine a point of time at which a status check command is sent to the memory device 110 based on the status check delay information SCD_INF at S1320. The status check command instructs the memory device 110 to perform an operation of checking whether a program operation is completed when the program operation is performed on the memory device 110.

The memory controller 120 may update the status check delay information SCD_INF while the memory device 110 is in an idle state at S1330.

Meanwhile, the above-described operation of the memory controller 120 may be controlled by the control circuit 123 of FIG. 1, and may be performed in such a manner that the processor 124 of FIG. 1 executes or drives a firmware to which general operations of the memory controller 120 are programmed.

Figure 14:
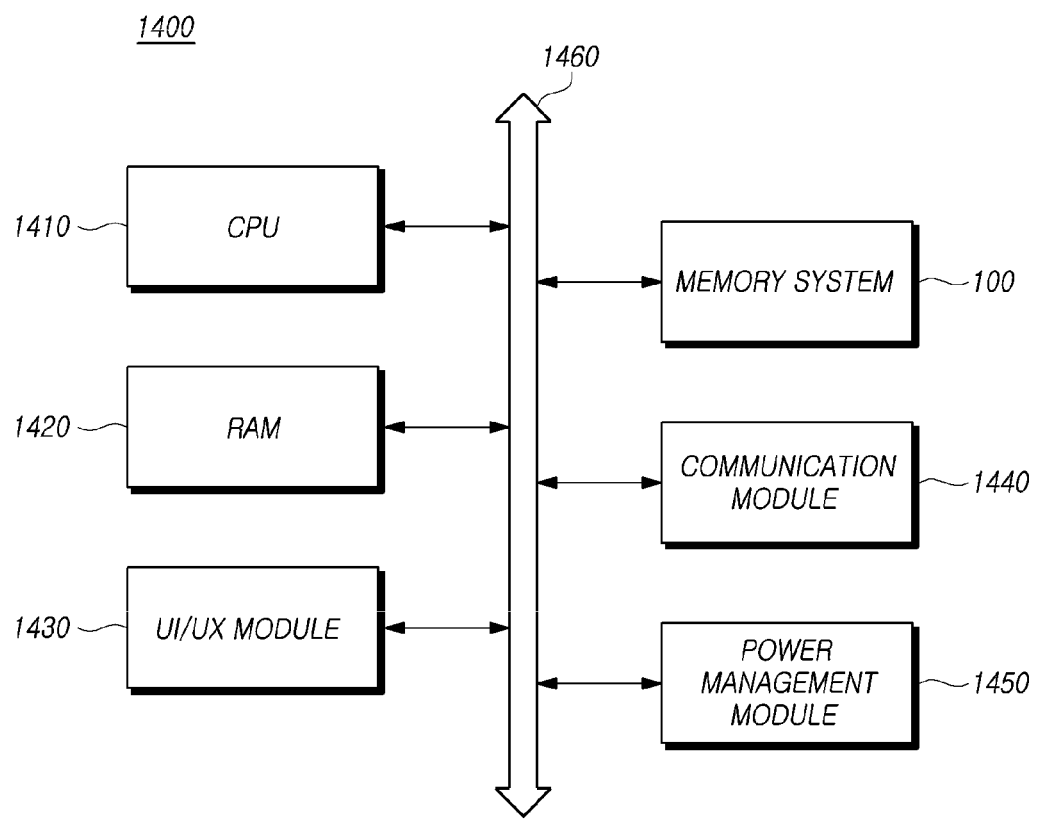
FIG. 14 illustrates a computing system in accordance with an embodiment of the present disclosure.

FIG. 14 illustrates a computing system 1400 in accordance with an embodiment of the present disclosure.

Referring to FIG. 14, the computing system 1400 may include a memory system 100, a central processing unit (CPU) 1410 for controlling general operations of the computing system 1400, a RAM 1420 for storing data and information related with operations of the computing system 1400, a UI/UX (user interface/user experience) module 1430 for providing use environment to a user, a communication module 1440 for communicating with an external device in a wired and/or wireless manner, and a power management module 1450 for managing power used by the computing system 1400. The above components of the computing system 1400 are electrically coupled to a system bus 1460.

The computing system 1400 may be a PC (personal computer), a mobile terminal such as a smartphone, a tablet, or the like, or any of various electronic devices.

The computing system 1400 may further include a battery for supplying an operating voltage, and may further include an application chipset, a graphic-related module, a camera image processor (CIS), a DRAM, and so forth. Besides, it is obvious to those skilled in the art that the computing system 1400 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device, or an embedded MMC (eMMC) device. The nonvolatile memory may include any of a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), an FRAM (ferroelectric RAM), and so on. In addition, the memory system 100 may be realized into various types of storage devices, and may be mounted in various electronic devices. The memory system 100 of FIG. 14 may be implemented with the memory system 100 shown in FIG. 1.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted by the appended claims and encompass all equivalents falling within the scope of the appended claims.

What is claimed is:

1. A memory system, comprising:
 a memory device including a plurality of memory dies, each of which includes a plurality of memory blocks; and
 a memory controller configured to control the memory device,
 wherein the memory controller loads status check delay information for each of the plurality of memory dies from the memory device, the status check delay information corresponding to a program time of each of the plurality of memory dies,
 wherein the memory controller determines, based on the status check delay information, a point of time at which a status check command is sent to the memory device after the memory device is instructed to perform a program operation, the status check command instructing the memory device to perform an operation of checking whether the program operation is completed,
 wherein the memory controller updates the status check delay information while the memory device is in an idle state, and
 wherein, when the memory device is in the idle state, the memory device does not execute any of read, program, and erase operations requested by a host and a background operation triggered by the memory controller.

2. The memory system according to claim 1, wherein the memory controller updates the status check delay information by measuring a program time of a target memory block selected from among the memory blocks in the memory device.

3. The memory system according to claim 2, wherein the target memory block is a free memory block.

4. The memory system according to claim 2, wherein the memory controller measures the program time of the target memory block by sending, to the memory device, a dummy command for instructing the memory device to perform an operation of programming dummy data to the target memory block.

5. The memory system according to claim 4, wherein the memory controller measures the program time of the target memory block by checking whether the program operation instructed by the dummy command is completed at each preset time after sending the dummy command to the memory device.

6. The memory system according to claim 2, wherein the memory controller measures the program time of the target memory block every measurement period.

7. The memory system according to claim 6, wherein the measurement period is changed depending on a program/erase cycle count value for the target memory block.

8. The memory system according to claim 6, wherein the memory controller updates the status check delay information based on a weighted moving average value for a program time of the target memory block that is measured at each measurement period.

9. The memory system according to claim 1, wherein the memory controller determines the point of time at which the status check command is sent to the memory device based on a minimum value of the status check delay information for the plurality of memory dies.

10. A memory controller, comprising:
a memory interface configured to communicate with a memory device including a plurality of memory dies, each of which includes a plurality of memory blocks; and
a control circuit configured to control the memory device, wherein the control circuit loads status check delay information for each of the plurality of memory dies from the memory device, the status check delay information corresponding to a program time of each of the plurality of memory dies,
wherein the control circuit determines, based on the status check delay information, a point of time at which a status check command is sent to the memory device after the memory device is instructed to perform a program operation, the status check command instructing the memory device to perform an operation of checking whether the program operation is completed,
wherein the control circuit updates the status check delay information while the memory device is in an idle state, and
wherein, when the memory device is in the idle state, the memory device does not execute any of read, program, and erase operations requested by a host and a background operation triggered by the memory controller.

11. The memory controller according to claim 10, wherein the control circuit updates the status check delay information by measuring a program time of a target memory block selected from among the memory blocks in the memory device.

12. The memory controller according to claim 11, wherein the target memory block is a free memory block.

13. The memory controller according to claim 11, wherein the control circuit measures the program time of the target memory block by sending, to the memory device, a dummy command for instructing the memory device to perform an operation of programming dummy data to the target memory block.

14. The memory controller according to claim 13, wherein the control circuit measures the program time of the target memory block by checking whether the program operation instructed by the dummy command is completed at each preset time after sending the dummy command to the memory device.

15. The memory controller according to claim 11, wherein the control circuit measures the program time of the target memory block every measurement period.

16. The memory controller according to claim 15, wherein the measurement period is changed depending on a program/erase cycle count value for the target memory block.

17. The memory controller according to claim 15, wherein the control circuit updates the status check delay information, based on a weighted moving average value for a program time of the target memory block that is measured at each measurement period.

18. The memory controller according to claim 10, wherein the control circuit determines the point of time at which the status check command is sent to the memory device based on a minimum value of the status check delay information for the plurality of memory dies.

19. A method of operating a memory controller for controlling a memory device, the method comprising:
loading status check delay information for each of a plurality of memory dies from the memory device that includes the plurality of memory dies, the status check delay information corresponding to a program time of each of the plurality of memory dies;
determining, based on the status check delay information, a point of time at which the status check command is sent to the memory device, the status check command instructing the memory device to perform an operation of checking whether a program operation is completed after the memory device is instructed to perform the program operation; and
updating the status check delay information while the memory device is in an idle state,
wherein, when the memory device is in the idle state, the memory device does not execute any of read, program, and erase operations requested by a host and a background operation triggered by the memory controller.

20. The method of 19, wherein the status check delay information indicates a time difference between when the memory controller instructs the memory device to perform a program operation and when the memory controller sends a status check command to the memory device.

* * * * *